May 6, 1947.　　　　　J. W. BURNETT　　　　　2,420,121
RAILWAY TANK CAR
Filed Aug. 26, 1944　　　　　3 Sheets-Sheet 1
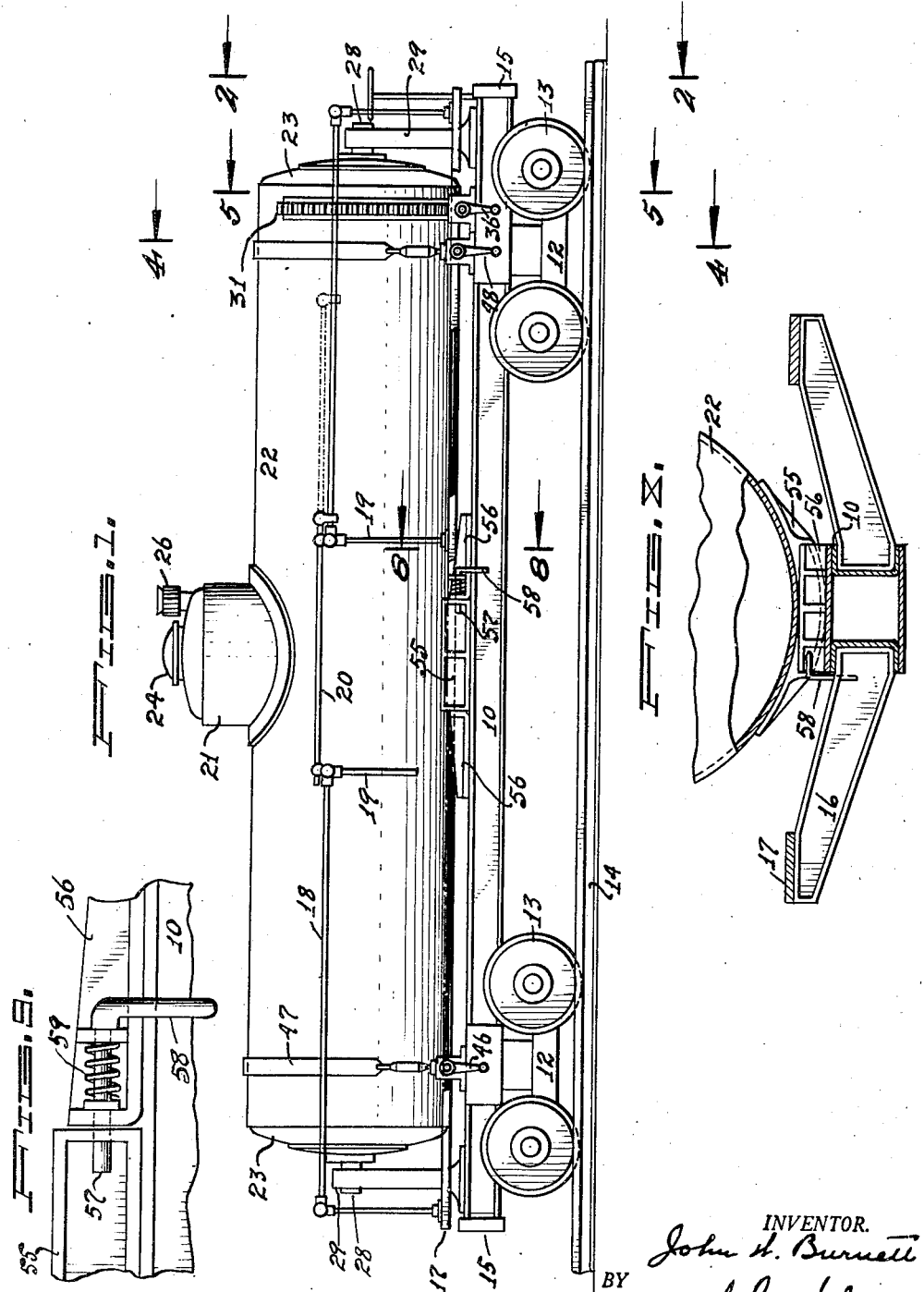
INVENTOR.
John W. Burnett
ATTORNEY.

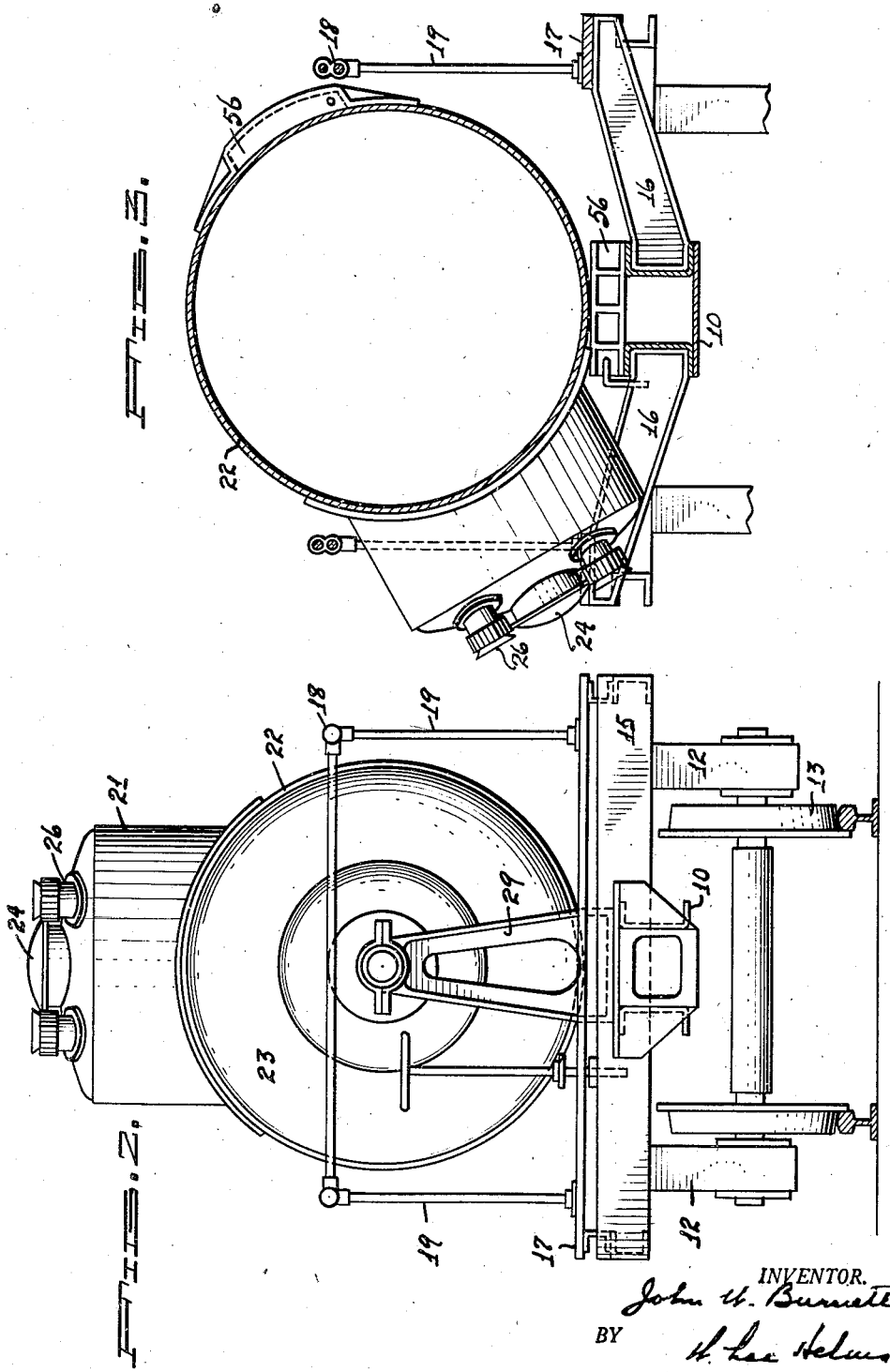

May 6, 1947.  J. W. BURNETT  2,420,121
RAILWAY TANK CAR
Filed Aug. 26, 1944  3 Sheets-Sheet 3
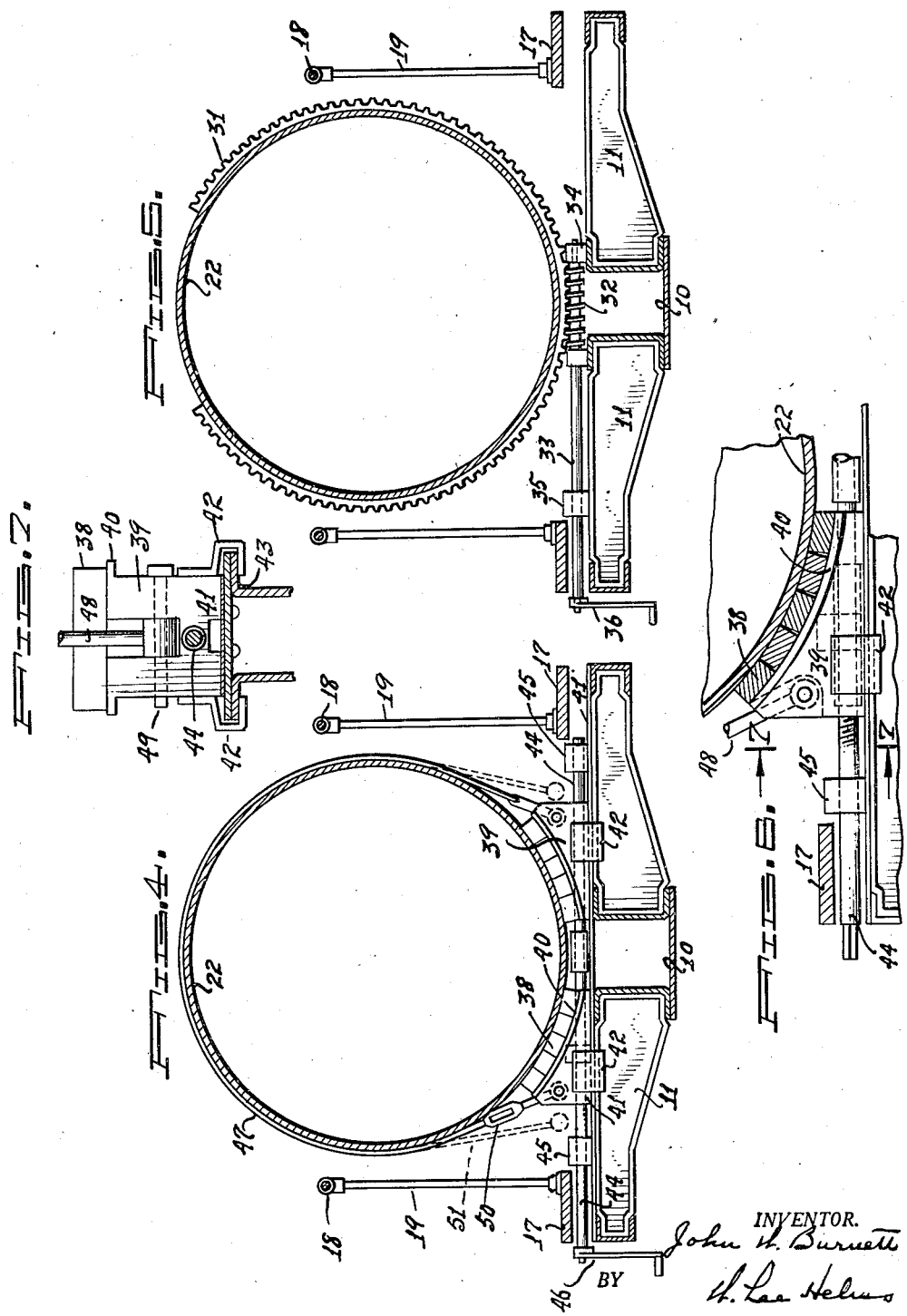
INVENTOR.
John W. Burnett
BY
W. Lee Helms
ATTORNEY.

Patented May 6, 1947

2,420,121

UNITED STATES PATENT OFFICE 2,420,121

RAILWAY TANK CAR

John W. Burnett, Chicago, Ill., assignor to Reynolds Metals Co., Richmond, Va., a corporation of Delaware Application August 26, 1944, Serial No. 551,329

6 Claims. (Cl. 105—270)

1

This invention relates to improvements in tank vehicles for the transportation of bulk liquids and finely divided solids, and more particularly to railway tank cars for the safe and economical transportation of pourable liquids and divided solid materials such as gasoline, light oils, liquid soap, milk, heavy oils, pastes, powders, etc.

Heretofore, materials of the description mentioned have been transported in railway tank cars having a discharge valve at the bottom of the tank. A serious drawback of such a construction resides in the fact that if such a tank car is derailed, the bottom valve is usually torn away from the car, thus causing the contents to spill and, in the case of easily combustible materials, to become ignited with considerable damage to property and possible loss of life.

Other disadvantages inherent in tank cars having a bottom discharge valve are that (1) such valves are apt to develop leaks, particularly where the tanks are filled with thin liquids such as gasoline; and (2) if the tanks contain semi-liquid or viscous substances, there is the disadvantage that the unloading of the materials is very slow and time-consuming.

To avoid the use of a bottom discharge outlet it has been proposed to provide a closable opening for charging and discharging the contents of a tank car and so mounting the tank that it can be rotated from a charging and transporting position with the opening upward, to a discharging position with the opening downward. Such a tank when fully charged is heavy and even when supported on rollers the tank is difficult to turn by hand power which is usually the only power available. It has been proposed to turn such tanks by a crank connected to a pinion meshing with a ring gear on the tank, but such means is very dangerous in that the eccentric load of the tank which has a dome, or of the contents at certain positions, will cause the tank to rotate the crank if the crank should slip out of the operator's hand. For freely turning the tank for unloading, the means for securing the tank to the car frame must be quickly freed and when the tank is in the transporting position there must be provided a quickly applicable and safe means for anchoring the tank to the frame for adequate vertical support of the load, for adequate support against side-sway, and to secure the tank safely against endwise movement with respect to the car frame when the car is subject to the customary endwise shocks.

A principal object of the present invention therefore is to provide a tank vehicle of the tilt-

2 ing or dumping type of improved construction which shall avoid the disadvantages of prior tank cars.

Other objects of the present invention are to provide a tank car of the dumping type which includes: means for rotating the tank, such means being irreversible and self-locking and which is freely and easily operable; a bearing supporting means for the tank that permits free rotation with a minimum of friction when the tank is rotated; a supporting means for supporting the vertical load of the tank and securing the tank against side-sway which is easily applied when the tank is to be transported and quickly released when the tank is to be unloaded; a tank supporting means including wedge blocks and a hold-down band with means for simultaneously tightening the band and positioning the blocks to carry the load; means for preventing relative longitudinal movement between the tank and car frame when in transporting position which is also provided with means for locking the tank against rotation; and to provide a vehicle of the type described which is economical to construct and efficient to operate, avoids the hazard of the bottom outlet, and saves time when unloading the materials transported.

Other objects of the invention will in part be obvious and will in part become apparent from the following detailed description of one embodiment thereof, in which:

Figure 1 is a view in longitudinal elevation of a railroad tank car according to this invention;

Figure 2 is an end view along line 2—2 of Figure 1;

Figure 3 is a transverse cross-sectional view showing the tank in its unloading position;

Figure 4 is a view of a cross-section taken along line 4—4 of Figure 1 to show the wedge blocks and hold-down straps;

Figure 5 is a view of a cross-section taken along line 5—5 to show the rotating mechanism;

Figure 6 is an enlarged fragmentary detail view of the tank support wedge blocks shown in Figure 4;

Figure 7 is a fragmentary sectional view taken along line 7—7 of Figure 6;

Figure 8 is a fragmentary sectional view taken along line 8—8 in Figure 1 showing the longitudinal movement buffer and anti-rotation lock; and Figure 9 is a detail fragmentary elevational view of the anti-rotation lock on the buffer.

Briefly the tank car of the present invention has common filling and discharge openings on one side of a generally cylindrical tank which is preferably mounted by trunnions in the center of each end head in supporting bearings. The tank is thus freely rotatable about its longitudinal axis in the support which need be only strong enough to support the load when the car is stationary. When the car is to be transported, two sets of wedge blocks are moved inward to engage the lower tank surface and the car frame in such a manner as to take the load of the tank off the trunnion bearings. Engagement of the wedge blocks by a simple crank operation simultaneously tightens hold-down bands which secure the tank against side-sway. When the tank is rotated to transport position a block on the tank is automatically engaged between buffer blocks on the center sill of the vehicle frame to secure the tank against endwise shifting, and a lock pin is applied to secure the tank block and a buffer block together to lock the tank against rotation. Generally longitudinal catwalks or running boards and hand rails may be provided on the frame and when such are employed they are arranged with movable sections for permitting the dome of the tank to swing down without interference therewith.

Referring now to the drawings, there is semi-diagrammatically illustrated a railroad car frame of suitable construction as known to the railroad tank car art. The car frame includes a main box-like longitudinal center sill 10 provided near each end thereof with cross members or bolsters 11 under which are the trucks 12, the wheels 13 of which run on the rails 14. The frame is also provided with end cross members 15, and laterally extending arms 16 are provided at suitably spaced points along the sill 10 to support longitudinal running boards 17. Hand rails 18 are secured to stanchions 19 along the boards 17. At the center of the car the hand rails 18 are provided with a movable section 20 which is slideably secured within an extension fitting at the upper ends of adjacent stanchions 19 and has on one end a fitting encircling the rail 18 so that the section 20 may be slid endwise to provide an opening in the hand rail for the passage of the dome 21 of the tank 22.

The tank 22 is generally cylindrical and has dished end heads 23. The tank 22 is of suitable wall thickness, and may or may not have a lining or may be provided with insulation according to the kind of material to be transported. The dome 21 may be of any suitable shape and is illustrated as cylindrical with a man-hole closure 24 at the center of its top and with two filling and discharge openings 26 which may be provided with suitable closures such as caps or valves. The dome may also be provided with safety devices such as relief valves and bursting disks, if the nature of the content requires them but which are not shown in the interests of clearness. For rotatably supporting the tanks, trunnions 28 are secured axially to the heads 23 and are supported in bearings 29 extending upward from the sill 10.

Means for rotating the tank is illustrated more clearly in Figures 1 and 5 and consists of a ring gear 1 secured circumferentially to the outside of the tank wall preferably near the end of the tank. The gear 31 meshes with a worm 32 mounted on a transverse shaft 33 in tangential relation to the tank, said shaft being mounted in bearings one bearing 34 being secured to the sill 10 and another bearing 35 being mounted on one arm of the bolster 11. To the extending end of the shaft 33 there is secured a hand crank 36 adapted to rotate the shaft 33 with a relatively light force. Obviously, power means may be employed to rotate the shaft 33 in case such means is available. The pitch of the worm 32 is so selected that the gearing is irreversible so that force on the gear 31 cannot rotate the crank 36 against the forces of friction and gravity.

The means to secure the tank safely for transit is shown more clearly in Figures 4, 6, 7 and 9, and as shown in Figures 4, 6 and 7 comprises four sets of wedge blocks 38, each set being secured to retractable supports 39. The supports 39 have upper surfaces 40 to which the blocks 38 are secured, curved to fit the tank contour and have bottom surfaces 41 which are slidable along the top of the bolster arms 11. Each support has a pair of clamp members 42 formed to extend around and engage the under surfaces 43 of the bolster flanges to allow sliding movement only. Passing through opposite supports 39 there is provided an oppositely threaded shaft 44, the threads of which engage threaded portions of the supports 39 in such a manner that rotation of the shaft 44 in one direction draws the opposing supports together and drives the blocks into supporting engagement with the tank 22. The shaft 44 is rotatably supported in bearings 45 secured to the top of bolster arms 11 and carries at one end thereof a crank handle 46. Holddown straps 47 encircle the upper part of the tank and have their ends secured to eyed rods 48 which are secured by pins 49 to the supports 39. Adjustment of the length of the straps 47 is preferably arranged for by including a turnbuckle 50 between one rod 48 and one end of the strap 47. The position of the ends of the straps when the wedge blocks 38 are moved to a disengaged position is indicated by the broken lines 51 in Figure 4. The turnbuckle 50 is so adjusted that when the blocks 38 are engaged to fully support the tank, the straps will be pulled tight around the tank. When the supports 39 are moved outward the straps 47 are automatically loosened. A locking device (not shown) is preferably provided to secure firmly the shaft 44 so that it cannot turn when the blocks 38 are in engaged position unless released by the operator. Alternatively the crank 46 may be strapped down and padlocked.

For securing the tank against endwise shifting on the car frame, a block 55 is secured to the normally bottom surface of the tank, and the block 55 is normally engaged between two buffer blocks 56 secured to the top of the center sill 10. For insuring against undesired rotation of the tank, anti-rotation means is preferably provided by engaging a locking pin 57 through the adjacent faces of a buffer block 56 and the block 55. As shown in Figure 9, one end of the pin 57 is bent to form a convenient handle 58 and a spring 59 is provided on the pin to urge the pin into engaged position.

The operation of the improved tank car has been generally indicated in the above description. The car is filled, when the tank is upright, through the manhole 24 or valve 26, and when the blocks 38 and straps 47 are tightly engaged and locked. When filled and closed the car is hauled to the unloading destination and the manhole cover removed or the valve opened. The shaft 44 is then unlocked and the cranks 46 applied and turned counterclockwise to draw apart the supports 39 and loosen the straps 47. The tank now rests on the bearings 29 which are preferably maintained well lubricated and protected from the weather so that they are always freely operable. Thereupon the lock pin 57 is disengaged from the block 55, the rail section 20 is slid to one side and the running board section is folded to provide clearance for the car dome. The crank 36 is now rotated to tilt the tank sufficiently to dump or pour out the contents into suitable receiving means at one side of the track. When the tank is emptied it is rotated to upright position, the lock pin 57 reengaged, the cranks 46 turned clockwise to anchor the tank to the bolsters, shaft 44 is locked and the rail and running board sections are replaced. The tank car is ready for the return trip after closing the manhole or valve.

It will be understood that in the disclosure described above, various modifications in detail may be made without affecting the principle of the invention, and that the invention is not to be considered as limited by any of the embodiments or modifications thereof which are described herein for illustration purposes only, but solely by the terms of the appended claims.

What is claimed is:

1. A transport container of the tilting or dumping type for liquids and like materials, comprising a vehicle frame; a generally cylindrical tank for holding said materials; and separate means for supporting said tank during rotation and during transport including trunnion bearings at each end of the tank and additional supporting means engageable between said tank and said frame; said latter means being adapted to be retracted in a manner to permit the tank to be supported by said trunnion bearings for rotation.

2. A transport container of the tilting or dumping type for liquids and like materials comprising a vehicle frame; a generally cylindrical tank for holding said materials; and means for supporting the tank comprising trunnion bearings at each end of the tank and additional supporting means engageable between said tank and said frame, said latter means being arranged in pairs, each pair being oppositely disposed and adapted to be retracted so as to permit the tank to be supported solely by said trunnion bearings for rotation.

3. A transport container of the tilting or dumping type for liquids and like materials comprising a vehicle frame; a generally cylindrical tank for holding said materials; and means for supporting the tank comprising trunnion bearings at each end of the tank and additional supporting means engageable between said tank and said frame, said latter means being arranged in pairs, each pair being oppositely disposed and an oppositely threaded common shaft passing through said supports for drawing them toward each other into tank supporting position and for moving them away from tank supporting position during rotation of the tank.

4. A transport container of the tilting or dumping type for liquids and like materials comprising a vehicle frame; a generally cylindrical tank for holding said materials; and means for supporting the tank comprising trunnion bearings at each end of the tank and additional supporting means engageable between said tank and said frame, said latter means being adapted to be retracted so as to permit the tank to be supported solely by said trunnion bearings for rotation, and hold down straps associated with said additional supporting means and arranged to be tightened about said tank when said additional supports are moved into tank engaging position.

5. A transport container of the tilting or dumping type for liquids and like materials comprising a vehicle frame; a generally cylindrical tank for holding said materials; and means for supporting the tank comprising trunnion bearings at each end of the tank and additional supports engageable between said tank and said frame, said supports being arranged in pairs, each pair being oppositely disposed and adapted to be retracted so as to permit the tank to be supported solely by said trunnion bearings for rotation, and hold down bands around the tank, each band having its ends connected to corresponding opposed sets of said retractable supports and passing over the tank in such a manner that the bands are tightened on the tank when the said supports are moved into tank supporting position and are loosened when the supports are moved away from such position.

6. A transport container of the tilting or dumping type for liquids and like materials comprising a vehicle frame; a generally cylindrical tank for holding said materials having a dome on its normally upper side; and means for supporting the tank comprising trunnion bearings at each end of the tank and additional supporting means engageable between said tank and said frame, said latter means being adapted to be retracted so as to permit the tank to be supported solely by said trunnion bearings for rotation, and a hand rail along the sides of said vehicle frame, said rail having a center section shiftable to one side to provide clearance for said dome when the tank is rotated.

JOHN W. BURNETT.

REFERENCES CITED

The following references are of record in the file of this patent:

UNITED STATES PATENTS

| Number | Name | Date |
| --- | --- | --- |
| 821,808 | Knittel | May 29, 1906 |
| 1,287,292 | Gordon | Dec. 10, 1918 |
| 1,980,895 | Windecker | Nov. 13, 1934 |
| 2,141,694 | Olson | Dec. 27, 1938 |
| Re. 8,071 | McGarry | Feb. 5, 1878 |
| 835,392 | Brock | Nov. 6, 1906 |
| 1,429,685 | Nelson | Sept. 19, 1922 |